US007512680B2

(12) United States Patent
Nishikawa et al.

(10) Patent No.: US 7,512,680 B2
(45) Date of Patent: Mar. 31, 2009

(54) SYSTEM MONITORING METHOD

(75) Inventors: Norifumi Nishikawa, Tokyo (JP); Kazuhiko Mogi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 926 days.

(21) Appl. No.: 10/871,814

(22) Filed: Jun. 21, 2004

(65) Prior Publication Data

US 2005/0198298 A1    Sep. 8, 2005

(30) Foreign Application Priority Data

Mar. 8, 2004    (JP)    .............................. 2004-063395

(51) Int. Cl.
    G06F 15/16    (2006.01)

(52) U.S. Cl. ........................ 709/224; 709/221; 710/56; 711/137; 714/38

(58) Field of Classification Search ................ 709/223, 709/224, 225, 226, 221; 710/56; 711/137; 714/38
See application file for complete search history.

(56) References Cited

U.S. PATENT DOCUMENTS

| | | | | |
|---|---|---|---|---|
| 5,796,633 A | | 8/1998 | Burgess et al. ......... 364/551.01 |
| 5,819,033 A | * | 10/1998 | Caccavale ................... 709/224 |
| 5,951,658 A | * | 9/1999 | Daray et al. ................... 710/56 |
| 5,961,596 A | | 10/1999 | Takubo et al. ............... 709/224 |
| 6,052,694 A | | 4/2000 | Bromberg ................... 707/200 |
| 6,167,538 A | | 12/2000 | Neufeld et al. ................ 714/47 |
| 6,301,615 B1 | | 10/2001 | Kutcher ....................... 709/224 |
| 6,351,847 B1 | * | 2/2002 | Sakamoto et al. ........... 717/127 |
| 6,397,252 B1 | | 5/2002 | Sadiq .......................... 709/226 |
| 6,691,067 B1 | | 2/2004 | Ding et al. ................... 702/186 |
| 6,901,486 B2 | * | 5/2005 | Handgen et al. ............. 711/137 |
| 7,000,150 B1 | * | 2/2006 | Zunino et al. .................. 714/38 |
| 2002/0059423 A1 | | 5/2002 | Levmann et al. ............. 709/226 |
| 2003/0126240 A1 | * | 7/2003 | Vosseler ....................... 709/221 |
| 2003/0149685 A1 | | 8/2003 | Trossman et al. ............ 718/104 |
| 2003/0204588 A1 | | 10/2003 | Peebles et al. ............... 709/224 |
| 2005/0119996 A1 | | 6/2005 | Ohata et al. ..................... 707/3 |

OTHER PUBLICATIONS

"*Expansion of GUI Function,*" IBM, Jun. 2003, pp. 11-40.

* cited by examiner

*Primary Examiner*—Ario Etienne
*Assistant Examiner*—Andrew Georgandellis
(74) *Attorney, Agent, or Firm*—Mattingly, Stanger, Malur & Brundidge P.C.

(57) ABSTRACT

A second computer for monitoring a database management system and a storage subsystem introduced into a first computer, is provided with a step of acquiring profile information of an application, a step of determining a tuning item in accordance with the acquired profile information, and a step of transferring the determined tuning item to the first computer and the storage subsystem.

17 Claims, 12 Drawing Sheets

| DISK ACCESS PATTERN | TUNING ITEM | RULE | |
|---|---|---|---|
| RANDOM ACCESS | DBMS CACHE SIZE | DBMS CACHE HIT FACTOR < 85 → INCREASE DBMS CACHE SIZE BY 5 % EACH TIME<br>DBMS CACHE HIT FACTOR > 95 → DECREASE DBMS CACHE SIZE BY 5 % EACH TIME | 704a |
| SEQUENTIAL ACCESS | STORAGE PREFETCH AMOUNT | STORAGE PROCESSOR USE FACTOR > 95 → DECREASE PREFETCH AMOUNT BY 10 % EACH TIME<br>STORAGE PROCESSOR USE FACTOR < 50 → INCREASE PREFETCH AMOUNT BY 10 % EACH TIME | 704b |

| 102 | 201 | 202 |
|---|---|---|
| AP NAME | DISK ACCESS PATTERN | |
| AP1 | RANDOM ACCESS | ~203a |
| AP2 | SEQUENTIAL ACCESS | ~203b |

FIG. 3

| 111 TUNING ITEM | 301 DBMS CACHE HIT FACTOR | 302a STORAGE PROCESSOR USE FACTOR | 302b |
|---|---|---|---|
| DBMS CACHE SIZE | EVERY MINUTE | 0 | ~305a |
| STORAGE PREFETCH AMOUNT | EVEN TEN MINUTES | EVERY SECOND | ~305b |

FIG. 4

| 112 DISK ACCESS PATTERN | 701 TUNING ITEM | 702 RULE | 703 |
|---|---|---|---|
| RANDOM ACCESS | DBMS CACHE SIZE | DBMS CACHE HIT FACTOR < 85 → INCREASE DBMS CACHE SIZE BY 5 % EACH TIME<br>DBMS CACHE HIT FACTOR > 95 → DECREASE DBMS CACHE SIZE BY 5 % EACH TIME | ~704a |
| SEQUENTIAL ACCESS | STORAGE PREFETCH AMOUNT | STORAGE PROCESSOR USE FACTOR > 95 → DECREASE PREFETCH AMOUNT BY 10 % EACH TIME<br>STORAGE PROCESSOR USE FACTOR < 50 → INCREASE PREFETCH AMOUNT BY 10 % EACH TIME | ~704b |

FIG. 5

| AP NAME | DBMS CACHE HIT FACTOR | STORAGE PROCESSOR USE FACTOR | |
|---|---|---|---|
| AP1 | EVERY MINUTE | 0 | 804a |
| AP2 | EVEN TEN MINUTES | EVERY SECOND | 804b |

| AP NAME | ACTIVATION TIME | |
|---|---|---|
| AP1 | 10:00 | 903a |
| AP2 | 10:30 | 903b |

| MONITORING ITEM NAME | MONITOR AGENT NAME | APPARATUS NAME | |
|---|---|---|---|
| DBMS CACHE HIT FACTOR | DB MONITOR AGENT | BUSINESS SERVER | 1004a |
| STORAGE PROCESSOR USE FACTOR | MONITOR AGENT | STORAGE SUBSYSTEM | 1004b |

| 111 | 1301 | 1302a | 1302b |
|---|---|---|---|
| PERFORMANCE TARGET ITEM | TRANSACTION RESPONSE | AVERAGE I/O TIME | |
| TRANSACTION TIME | EVERY ONE MINUTE | 0 | ~305c |
| AVERAGE I/O TIME | 0 | EVERY ONE MINUTE | ~305d |

FIG. 14

| 116 | 1401 | 1402 | 1403 |
|---|---|---|---|
| | AP NAME | PERFORMANCE TARGET ITEM | PERFORMANCE TARGET VALUE |
| | AP1 | TRANSACTION TIME | 3 SECONDS OR SHORTER | ~1404a |
| | AP2 | AVERAGE I/O TIME | 10 MILLISECONDS OR SHORTER | ~1404b |

FIG. 15

| 113 | 801 | 802c | 802d |
|---|---|---|---|
| AP NAME | TRANSACTION RESPONSE | AVERAGE I/O TIME | |
| AP1 | EVERY ONE MINUTE | 0 | ~804c |
| AP2 | 0 | EVERY ONE MINUTE | ~804d |

FIG. 16

| 115 | 1001 | 1002 | 1003 |
|---|---|---|---|
| MONITORING ITEM NAME | MONITOR AGENT NAME | APPARATUS NAME | |
| TRANSACTION RESPONSE | DB MONITOR AGENT | BUSINESS SERVER | ~1004c |
| AVERAGE I/O TIME | OS MONITOR AGENT | BUSINESS SERVER | ~1004d |

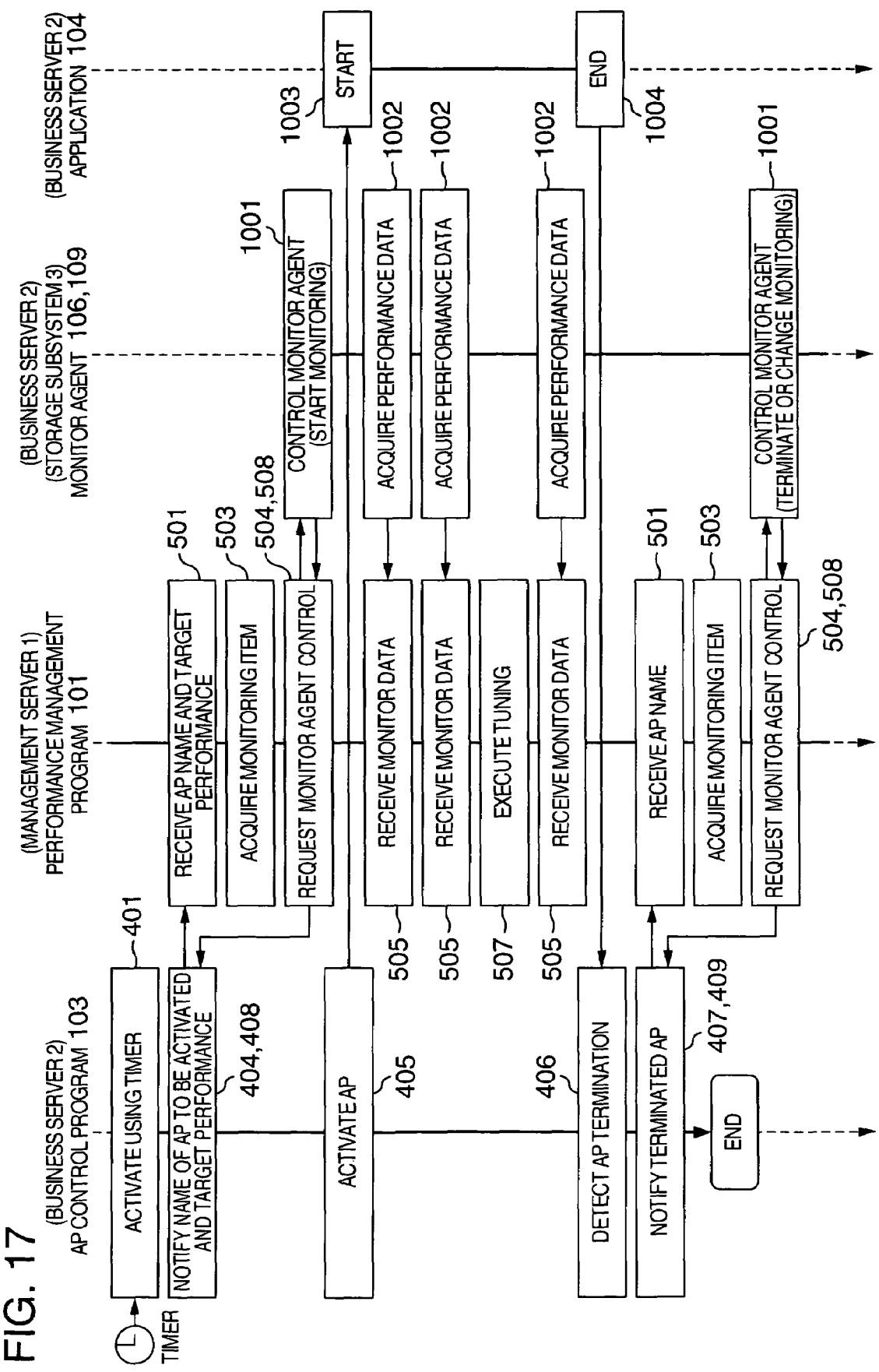

US 7,512,680 B2

SYSTEM MONITORING METHOD

CROSS-REFERENCE TO RELATED APPLICATION

The present application claims priority from Japanese application JP 2004-063395 filed on Mar. 8, 2004, the content of which is hereby incorporated by reference into this application.

BACKGROUND OF THE INVENTION

The present invention relates to a computer system and its monitoring and tuning method, and more particularly to a monitoring and tuning method for a database management system to be executed by a computer system and for a storage subsystem contained in the computer system.

Conventionally, in order to maintain or improve the process performance and usability of a computer, the computer system to be managed is monitored by another apparatus (hereinafter described as "monitoring" or "system monitoring") and an administrator or the like changes (hereinafter described as "tuning") the settings of the computer system via the other apparatus in accordance with the monitoring result. One of conventional techniques regarding monitoring for a computer system is disclosed in JP-A-2002-108817. This document discloses the technique that if the total sum of a load (work load) of a whole computer system under monitoring increases, a monitoring apparatus prolongs a monitoring interval for the computer system to reduce the monitoring load upon the computer system, whereas if the work load total sum reduces, the monitoring interval is shortened.

Another conventional technique regarding monitoring and tuning is disclosed in "SMART Extension Function—2 Health•Monitoring Tool" DB2 UDB V8 Technical Seminar Material. According to this document, if some problem is found in a computer system, a monitoring apparatus judges whether or not the problem can be solved by using presently monitored information. If the monitored information is insufficient, the monitoring apparatus automatically starts a monitoring tool to acquire necessary information from the computer system.

SUMMARY OF THE INVENTION

In order to perform proper tuning of a computer system, it is necessary to monitor how a load on each constituent element (hereinafter described as "resource") of a computer system changes during monitoring. The type and operation contents of each resource of a computer system to be monitored for proper tuning changes with each environment (for example, the type of an application to be executed by the computer system) of the computer system to be tuned by its user or the like.

Now consider conventional monitoring techniques for a computer system for proper tuning in each environment.

A conventional technique described in JP-A-2002-108817 does not consider at all which resource is monitored in what environment. Therefore, if monitoring for proper tuning in each environment is performed based on the conventional technique described in JP-A-2002-108817, it becomes necessary to monitor all resources. Since unnecessary resources are monitored, a load on the computer system and the amount of data acquired from the computer system increase.

In the case of the conventional technique regarding monitoring and tuning disclosed in "SMART Extension Function—2 Health•Monitoring Tool" DB2 UDB V8 Technical Seminar Material, the resources to be monitored are determined in advance, and if a problem is not found in a computer system to be monitored, any resource to be monitored will not be added. Therefore, according to the conventional technique regarding monitoring and tuning disclosed in "SMART Extension Function—2 Health•Monitoring Tool" DB2 UDB V8 Technical Seminar Material, monitoring for proper tuning in each environment is not possible.

In order to solve the above problems, an embodiment of the present invention has the following configuration. Namely, a system has a computer system and a second computer connected to the computer system. In this system, the computer system notifies the second computer of the type of a program to be executed by the computer system, and the second computer identifies a performance item in accordance with the notified type of the program to be executed and notifies the computer system of a collection of information regarding the notified performance item (hereinafter called "performance information"). The computer system collects the identified performance information in accordance with the notice contents.

The above-described configuration may have the configuration that the computer system notifies the second computer of the collected performance information, and if the notified performance information does not satisfy a predetermined condition, the second computer transmits to the computer system an instruction of changing settings of the computer system to predetermined values, and the computer system changes its settings in accordance with the instruction.

Further, the above-described configuration may have the configuration that the computer system notifies the second computer of the type of a program to be terminated at the computer system, the second computer identifies a second performance item in accordance with the notified type of the program to be terminated, and instructs the computer system to stop the collection of information regarding a second performance item (hereinafter called "second performance information"), and the computer system stops the collection of the second performance information in accordance with the collection stop instruction.

In the above-described configuration, the notice of collecting the performance information may contain the information regarding an interval at which the computer system collects the performance information.

The computer system may have a computer and a storage subsystem. Information of the performance item may be information regarding the performance to be realized by the system.

BRIEF DESCRIPTION OF THE DRAWINGS

FIG. 2 is a diagram showing an example of the structure of an application profile table.

FIG. 3 is a diagram showing an example of the structure of a monitor control information table.

FIG. 4 is a diagram showing an example of the structure of a tuning information table.

FIG. 5 is a diagram showing an example of the structure of an application status table.

FIG. 6 is a diagram showing an example of the structure of an application schedule.

FIG. 7 is a diagram showing an example of the structure of a monitor agent management table.

FIG. 13 is a diagram showing an example of the structure of a monitor control information table.

FIG. 14 is a diagram showing an example of the structure of an application target value table.

FIG. 15 is a diagram showing an example of the structure of an application status table according to the second embodiment.

FIG. 16 is a diagram showing an example of the structure of a monitor agent management table according to the second embodiment.

FIG. 17 is a diagram showing an example of the sequence of system monitoring according to the second embodiment.

DESCRIPTION OF THE EMBODIMENTS

Embodiments of the present invention will be described with reference to FIG. 1 to FIG. 19. It is obvious that the present invention is not limited only to the following embodiments.

Figure 1:
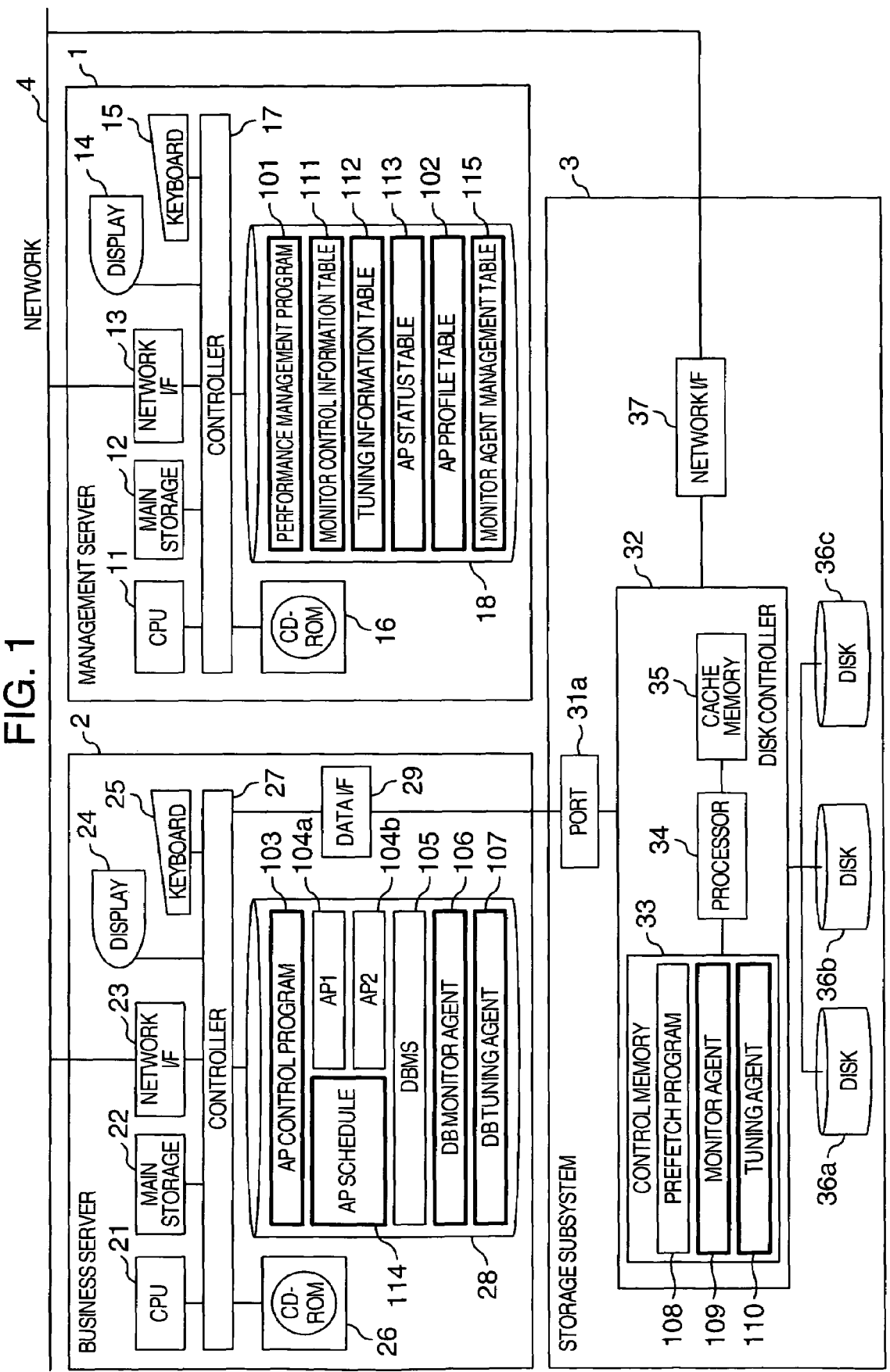
FIG. 1 is a diagram showing an example of the configuration of a system including a computer and a storage subsystem.

FIG. 1 is a diagram showing an example of the configuration of a system in which the present invention is embodied. This system has a management server 1, a computer system and a network 4. The system may have a plurality of constituent elements.

The computer system has also a business server 2 and a storage subsystem 3. The server is intended to mean a general computer. The business server 2 and storage subsystem 3 are interconnected by a communication line. The computer system may have only the business server or storage subsystem, or a plurality of business servers or storage subsystems.

The management server 1 has a CPU 11, a main storage 12, a network interface 13, a display 14, a keyboard 15, a CD-ROM 16, a controller 17, and a storage device 18.

The business server 2 has a CPU 21, a main storage 22, a network interface 23, a display 24, a keyboard 25, a CD-ROM 26, a controller 27, a storage device 28 and a data interface 29.

The storage subsystem 3 has a plurality of storage devices. The storage device is a storage medium such as a hard disk, a CD-ROM and a DVD. The storage subsystem 3 has a port 31, a disk controller 32, a control memory 33, a processor 34, a cache memory 35, a disk 36 and a network interface 37. The disk 36 is a storage device such as a hard disk. The storage subsystem 3 may have a RAID structure.

The storage device 18 of the management sever 1 stores therein a performance management program 101, a monitor control information table 111, a tuning information table 112, an application status table 113, a monitor agent management table 115 and an application profile table 102. The performance management program 101 is read to the main storage 12 by CPU 11 and executed by CPU 11. Each of the monitor control information table 111, tuning information table 112, application status table 113, monitor agent management table 115 and application profile table 102 is read to the main storage 12 by CPU 11 when the performance management program 101 is to be executed.

The storage device 28 of the business server 2 stores therein programs and tables including an application control program 103, an application 104, a database management system 105, a database monitor agent 106, a database tuning agent 107 and an application schedule 114. The application control program 103, application 104, database management system 105, database (DB) monitor agent 106 and database tuning agent 107 are stored in the storage device 28 from the CD-ROM 26, read to the main storage 22 and executed by CPU 21. The application schedule 114 is read to the main storage 22 by CPU 21 when the application control program 103 is to be executed.

The programs stored in the storage device 18 of the management server 1 are installed in the management server from CD-ROM 16. A storage medium to be used for installation is not limited only to CD-ROM, but other portable recording media may also be used. These programs may be installed in each apparatus via a network, without using a portable recording medium.

The control memory 33 of the storage subsystem 3 stores various programs such as a prefetch program 108, a monitor agent 109 and a tuning agent 111.

Data to be used by the business server 2 is stored in the disk 36 of the storage subsystem 3. Data read by the business server 2 is transferred by the processor 34 of the disk controller 32 from the disk 36 to the port 31 via the cache memory 35, and loaded in the main storage 22 via the data interface 29 of the business server 2. Data to be written into the storage subsystem 3 from the business server 2 is written into the disk 36 via the route reversed from the above-described read route.

In this embodiment, although the application control program 103, application schedule 114, application 104, database management system (DBMS) 105, DB monitor agent 106 and DB tuning agent 107 exist on the same business server 2, it is sufficient if the application control program 103 and application schedule 114 exist on the same server and if DBMS 105, DB monitor agent 106 and DB tuning agent exist on the same server.

Another configuration may be incorporated in which the programs and tables in the business server 2 and management server 1 exist on the same server.

FIG. 2 is a diagram showing an example of the contents of the application profile table 102. Information on an application to be executed by the business server 2 is registered in the application profile table 102. The application profile table 102 has a record corresponding to each application to be executed by the business server 2. Each record has a field 201 in which stored is the name of an application corresponding to the record, and a field 202 in which stored is the profile of an application corresponding to the record (hereinafter called "application profile"). In this embodiment, a disk access pattern to be used when an application issues a data input/output command (hereinafter abbreviated to "I/O") to the storage subsystem 3 is used as an application profile (field 202).

The application profile may be the information representative of a pattern indicating how an application uses a physical resource of the server such as a CPU and a disk and a logical resource configured on the physical resource (such as a logical disk area configured on a disk). If CPU of the server is used as the subject of the application profile, a CPU use factor may be used as the application profile.

FIG. 3 is a diagram showing an example of the structure of the monitor control information table 111. The monitor control information table 111 stores a setting item (hereinafter called a "tuning item") of a resource to be tuned, and information on a correspondence between what performance of the computer system is monitored (hereinafter called "monitoring item") when the tuning item is controlled and at what interval the performance is monitored (or not monitored) (hereinafter called "monitoring interval"). The monitor control information table 111 has a record corresponding to each tuning item.

Each record has a field 301 stored in which is the information representative of the tuning item, and a field 302 indicating which monitoring item is monitored (or not monitored) at what frequency relative to the tuning item corresponding to the record. In this embodiment, if a DBMS cache size and a storage prefetch amount are to be tuned, fields 302a and 302b store as the monitoring items the information of at what interval a DBMS cache hit factor, which is a hit ratio of an I/O request of DBMS upon a cache in DBMS, and a storage processor use factor, which is a use factor of a processor in the storage subsystem, are monitored (or not monitored). These monitoring items are monitored by the DB monitor agent 105 and monitor agent 109. Depending upon the profile of an application to be used or the tuning method, the monitoring item is not disclosed in this embodiment in some cases. For example, when a storage location of data in a disk is to be tuned, the number of I/O's to each storage area of data becomes the monitoring item. In another embodiment, all items having a possibility of being monitored by the system may be enumerated as the items of the monitor control information table 111. In this case, an optional monitoring interval is registered only in the field of a necessary monitoring item, and 0 is registered in the field of an unnecessary monitoring item.

FIG. 4 is a diagram showing an example of the structure of the tuning information table 112. This table 112 stores an application profile, a tuning item corresponding to the profile and a rule for determining a value to be used when the item is tuned. The tuning information table 112 has a record corresponding to each application profile. Each record has a field 701 for registering a corresponding application profile, a field 702 for registering a tuning item corresponding to the application profile, and a field 703 for registering a corresponding rule.

FIG. 5 is a diagram showing an example of the structure of the application status table 113. The application status table 113 stores the name of an application currently running on the system and information of the corresponding monitoring item and interval. The application status table 113 has a record corresponding to each application currently running on the system.

Each record has a field 801 for storing the name of an application currently under execution and a field 802 indicating the monitoring interval of the monitoring item of the corresponding application. Each record 804 of the application status table 113 is added when the management server 1 receives a notice of an application start from the business server 2, and deleted when an end notice is received.

FIG. 6 shows an example of the structure of the application schedule table 114. The application schedule table 114 is used for managing the information of the schedule (such as an execution start time) of each application to be executed by the business server 2. The application schedule table 114 has a field 901 for storing an application name and a field 902 indicating the time when the application is activated. The information such as an application end time may be registered.

FIG. 7 shows an example of the structure of the monitor agent management table 115. The monitor agent management table 115 stores the information on which monitor agent of what apparatus monitors the monitoring item to be monitored by the management server 2. The monitor agent management table 115 has a field 1001 for storing monitoring item name, a field 1002 for storing the name of a monitor agent for monitoring the monitoring item, and a field 1003 for storing the name of an apparatus having the monitor agent. Information in each table is registered in each apparatus by an administrator via a network or the like before the performance management program 101 starts.

In this system, when the management server 1 is notified of an application execution from the business server 2, the monitoring item and the interval matching the profile of the application are selected and each apparatus (business server and storage subsystem 3) is instructed to start monitoring. Upon reception of the monitoring result from each apparatus, the management server 1 judges from the monitoring result whether it is necessary to perform tuning. The management server 1 notified of an application end notifies a monitoring end to each apparatus, when necessary.

Figure 8:
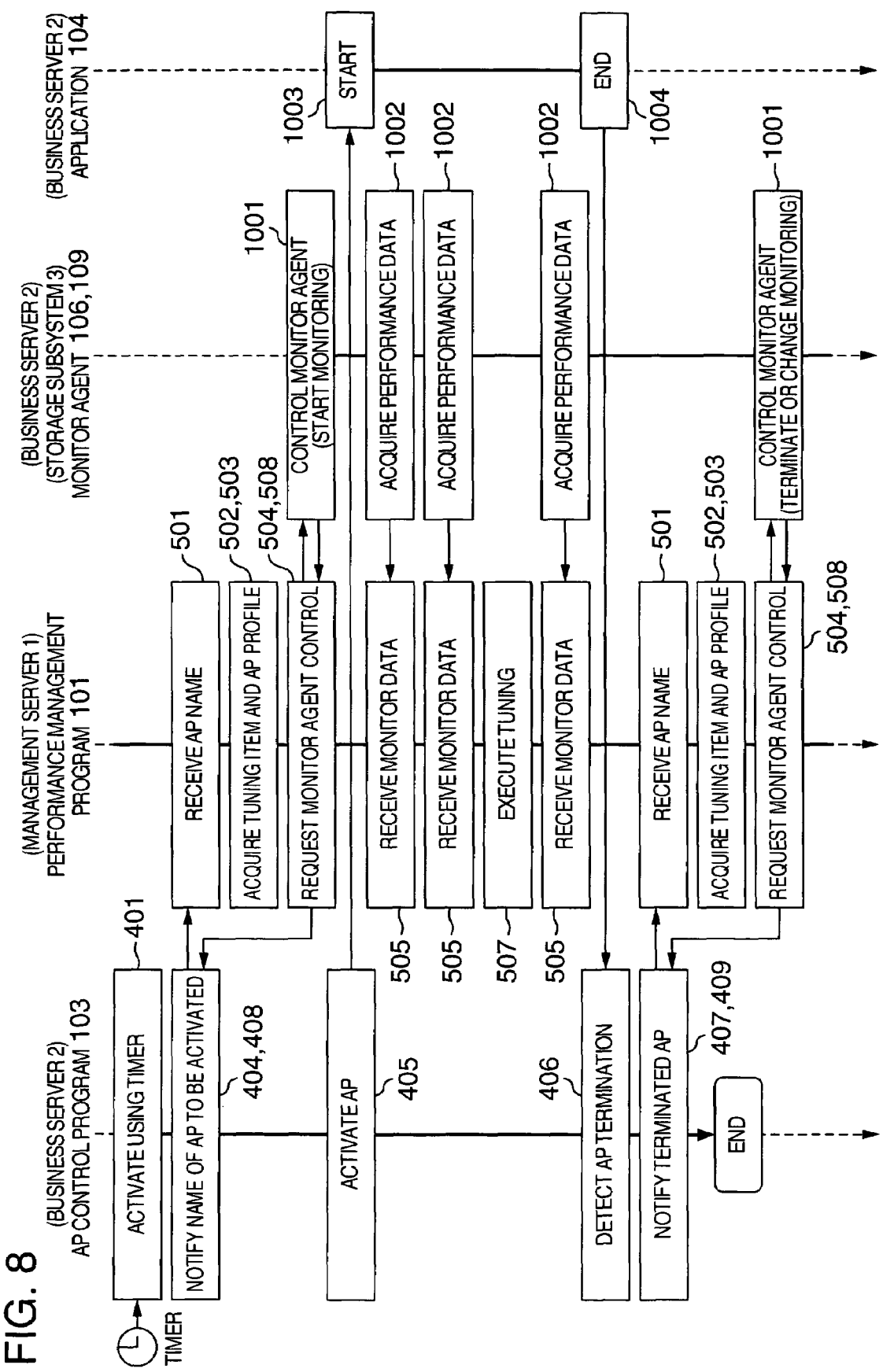
FIG. 8 is a diagram showing an example of a sequence of system monitoring.

With reference to FIG. 8, description will be made on the overall sequence of monitoring by the system. In the following description, if a program is used as the subject of a sentence, the actual process is executed by CPU executing the program.

First, a timer activates the application control program 103 of the business server 2 (Step 401). The application control program 103 refers to the application schedule table 114 to check if there is an application to be activated. If there is an application to be activated, the application control program 103 notifies the performance management program 101 of the management server 1 of the application name and an application activation notice via the network 4. The process at this Step may be executed when the administrator or the like using the business server 2 issues an application activation request, instead of using the information in the application schedule table 114 (Step 404).

The performance management program 101 received the application name refers to the tuning information table 112 and application profile table 102 to acquire the tuning item and application profile corresponding to the received application name (Step 502). The performance management program 101 refers to the monitor control information table 111 to determine the monitoring interval of each monitoring item corresponding to the acquired application profile. The performance management program 101 notifies the determined monitoring item and interval to the monitor agents 106 and 109 of the business server 2 and storage subsystem 3, respectively (Step 504).

The notified monitor agents 106 and 109 start monitoring the designated monitoring item at the designated monitoring interval. In this case, the monitoring agents 106 and 109 notify the monitoring start to the performance management program of the management server 1 via the network 4 (Step 1001).

The performance management program 101 received the notice of the monitoring notifies a start of monitoring to the application control program 103 of the business server 2 via the network 4. The application control program 103 received the notice activates the application (Step 508, Step 405 and Step 1003).

While the application runs, the monitor agents 106 and 109 acquire the performance data of each apparatus at the designated monitoring interval and notifies the acquired performance data (hereinafter also called "monitor data") to the performance management program 101 of the management server 1 via the network 4 (Step 1002). The performance management program 101 received the monitor data (Step 505) executes tuning if it is judged that the tuning is required to be executed (Step 507).

After the application is terminated (Step 1004), the application control program 103 detects a application termination (Step 406), notifies the terminated application name to the performance management program 101 of the management server 1 via the network 4 (Step 407), and receives its result (Step 409).

The performance management program 101 received the application name refers to the tables 102, 111 and 113 to determine a monitor agent control method in a manner similar to the case of the application start, and notifies this method to the monitor agent 106 and/or 109 (Step 504). The notified monitor agent changes (or terminates) the monitoring item and interval in accordance with the notice.

Description will be made on the details of the procedure at each apparatus.

Figure 9:
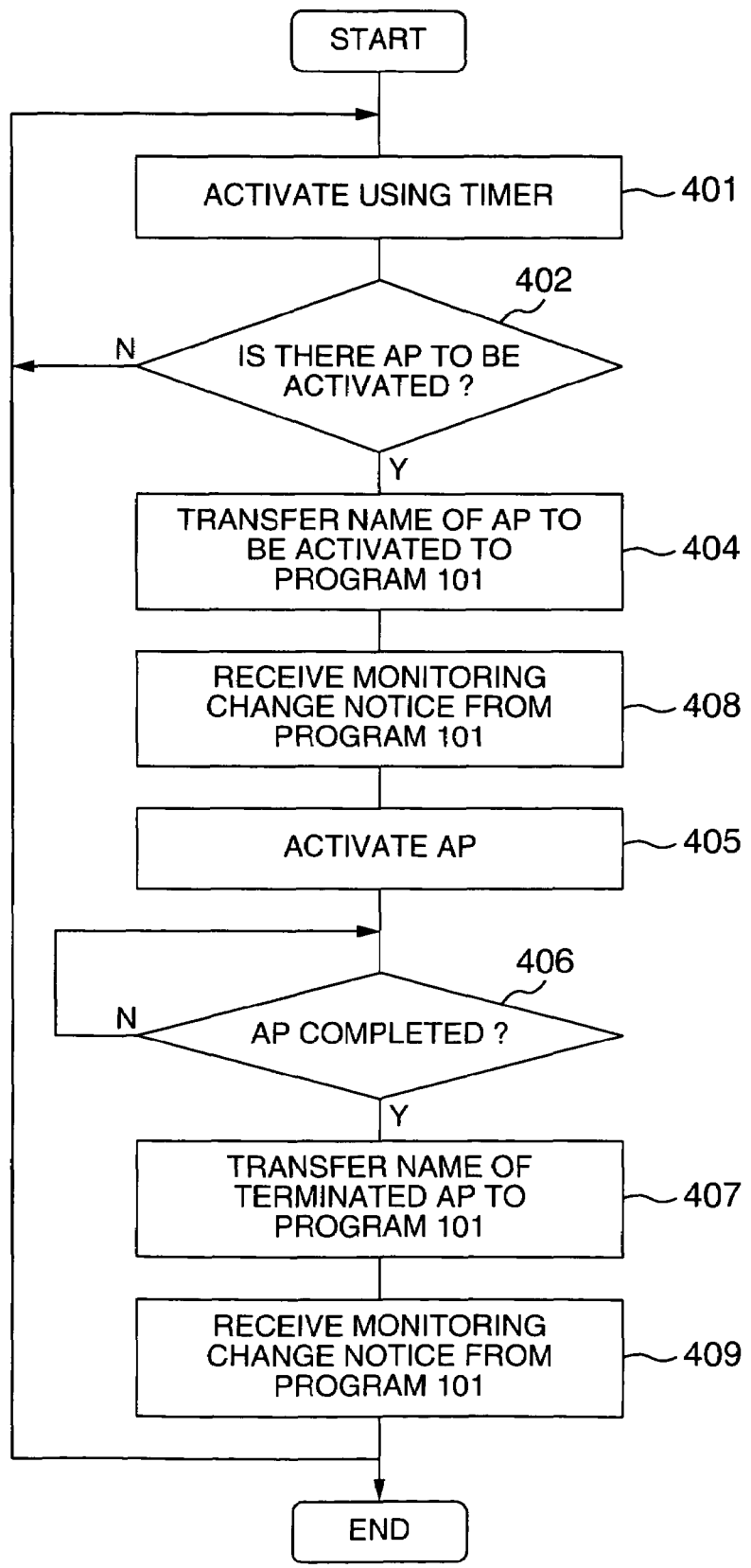
FIG. 9 is a diagram showing an example of the processes to be executed when a business server executes a control of monitoring.

FIG. 9 is a diagram illustrating an example of the procedure to be executed when the business server 2 executes the application control program 103 if the application 104 is to be executed. In FIG. 9, reference numerals identical to those shown in FIG. 8 indicate coincident processes at Steps.

The business server 2 first refers to fields 901 and 902 of the application schedule table 114 to judge if there is an application to be activated (Step 402). If there is an application to be activated, the business server 2 acquires the name of the application to be activated from the field 901, and transmits the acquired application name and an activation notice of the application 104 to the management server 1 via the network I/F 23 (Step 404). After a monitoring start notice or a monitoring content change process completion notice is received from the program 101 (Step 408), the business server 2 starts executing the application (Step 405). If there is no application to be activated, the business server 2 repeats the processes at Steps 401 and 402. In this embodiment, although the business server 2 activates the application after receiving the monitoring start (or content change) notice, the business server 2 may activate the application without waiting for the monitoring start (or content change) notice.

Thereafter, the business server 2 monitors a completion of the application 104 (Step 406). When the completion of the application 104 is detected, the business server 2 transmits the name of the completed application and a completion notice of the application to the performance management program 101 of the management server 1 (Step 407), and after a monitoring content change is notified from the program 101 (Step 409), the process at Step 401 resumes. In this embodiment, although the business server 2 receives the monitoring content change notice, this notice may not be received.

Figure 10:
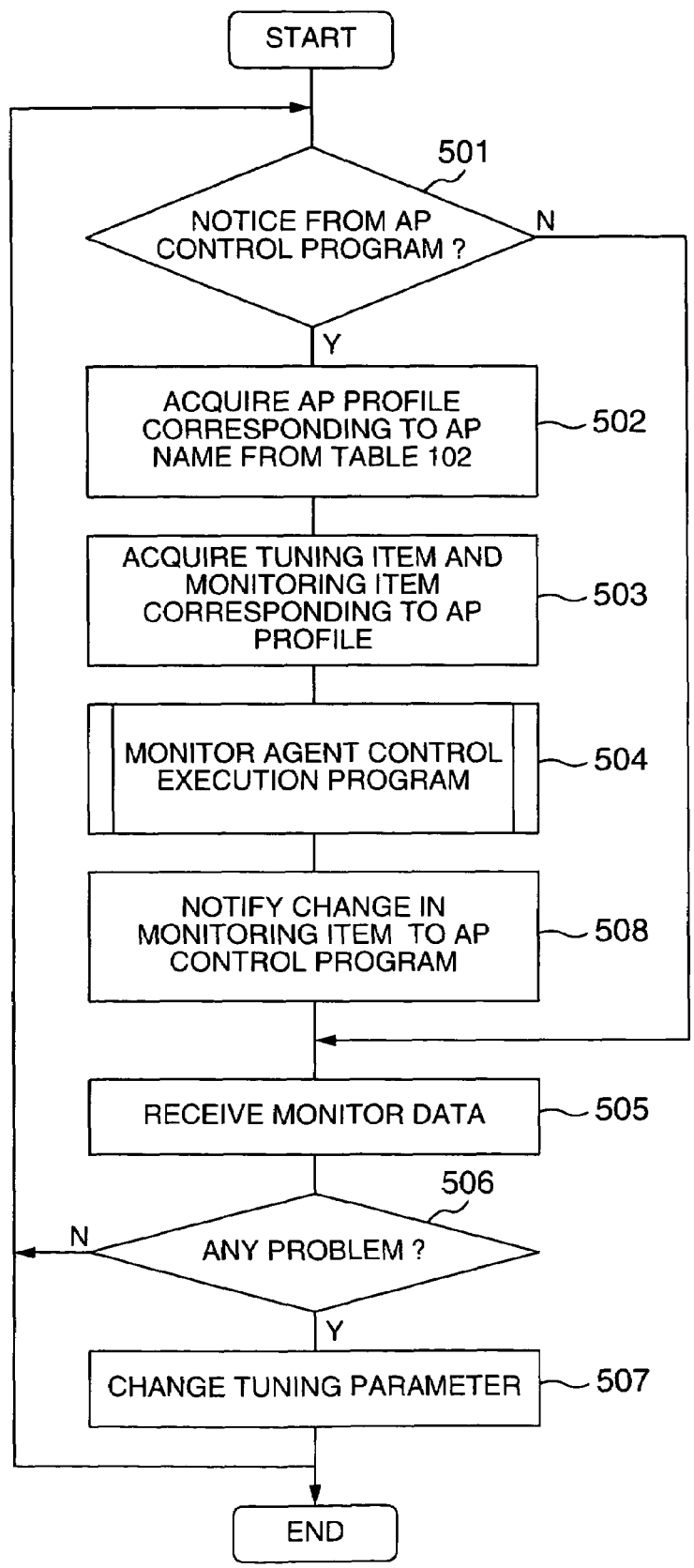
FIG. 10 is a diagram showing an example of the processes of executing a control of monitoring by a management server.

FIG. 10 is a diagram illustrating an example of the procedure of monitoring the computer system when the management server 1 executes the performance management program 101. Also in FIG. 10, Steps identical to those shown in FIG. 8 indicate coincident contents.

First, the management server 1 checks whether or not the business server 2 issues a notice of an application start or end (Step 501). Next, the management server 1 refers to the application profile table 102 to acquire an application profile corresponding to the received application name. The information of the application profile of the application 104 under execution by the business server 2 is stored in the management server 1 until the business server 2 notifies a next application execution or termination (Step 502).

Thereafter, the management server 1 refers to the tuning information table 112 to acquire a tuning item and a tuning rule corresponding to the acquired application profile. The management server 1 also refers to the monitor control information table 111 to acquire the information of a monitoring item and interval corresponding to the acquired application profile (Step 503). Thereafter, the management server 1 executes a monitor agent control process 504 and transfers the information of the monitoring item and interval to both or one of the business server 2 and storage subsystem 3 to be monitored. The operation of the monitor agent control process 504 will be later described (Step 504).

Thereafter, the management server 1 receives monitor data from both or one of the business server 2 and storage subsystem 3, the monitor data being the information of the operation and behavior of resources as the objects of the designated monitoring item (Step 505). The management server 1 received the monitor data judges whether the received monitor data is coincident with the condition registered in the field 703 of the tuning information table 112 corresponding to the application 104 (judged from the information of previously acquired application profile) under execution by the business server 2, to thereby judge whether system tuning is necessary (Step 506).

If the monitor data is coincident with the condition, i.e., if it is judged that tuning is necessary, the management server 1 instructs both or one of the business server 2 and storage subsystem 3 to which the monitor data was transmitted, to execute tuning to make the tuning item be coincident with the contents of the field 703, the tuning item being designated by the information stored in the field 702 of the tuning information table 112 corresponding to the acquired application profile information (Step 507).

One or both of the business server 2 and storage subsystem 3 received the information of the monitoring item and interval instruct the monitor agent designated by the received monitor agent name to start collecting information such as the behavior of the resources designated as the monitoring items. The monitor agent starts collecting the information such as the behavior of the resources designated as the monitoring items to thereby generate monitor data. If the monitoring interval designated for the received monitoring item is 0, the business server 2 and storage subsystem 3 terminate the information collection of the monitoring items, and notify the management server 1 of a completion of a change in the monitoring item. After the information collection, both or one of the business server 2 and storage subsystem 3 transmits the collected monitor data to the management server 1. The business server 2 and storage subsystem 3 perform monitoring in accordance with the monitoring interval for each monitoring item designated by the management server 1, and transfer the acquired data to the management server 1 at this interval.

Both or one of the business server 2 and storage subsystem 3 instructed to perform tuning executes the DB tuning agents 107 and 110 to perform tuning in accordance with the instruction contents.

Figure 11:
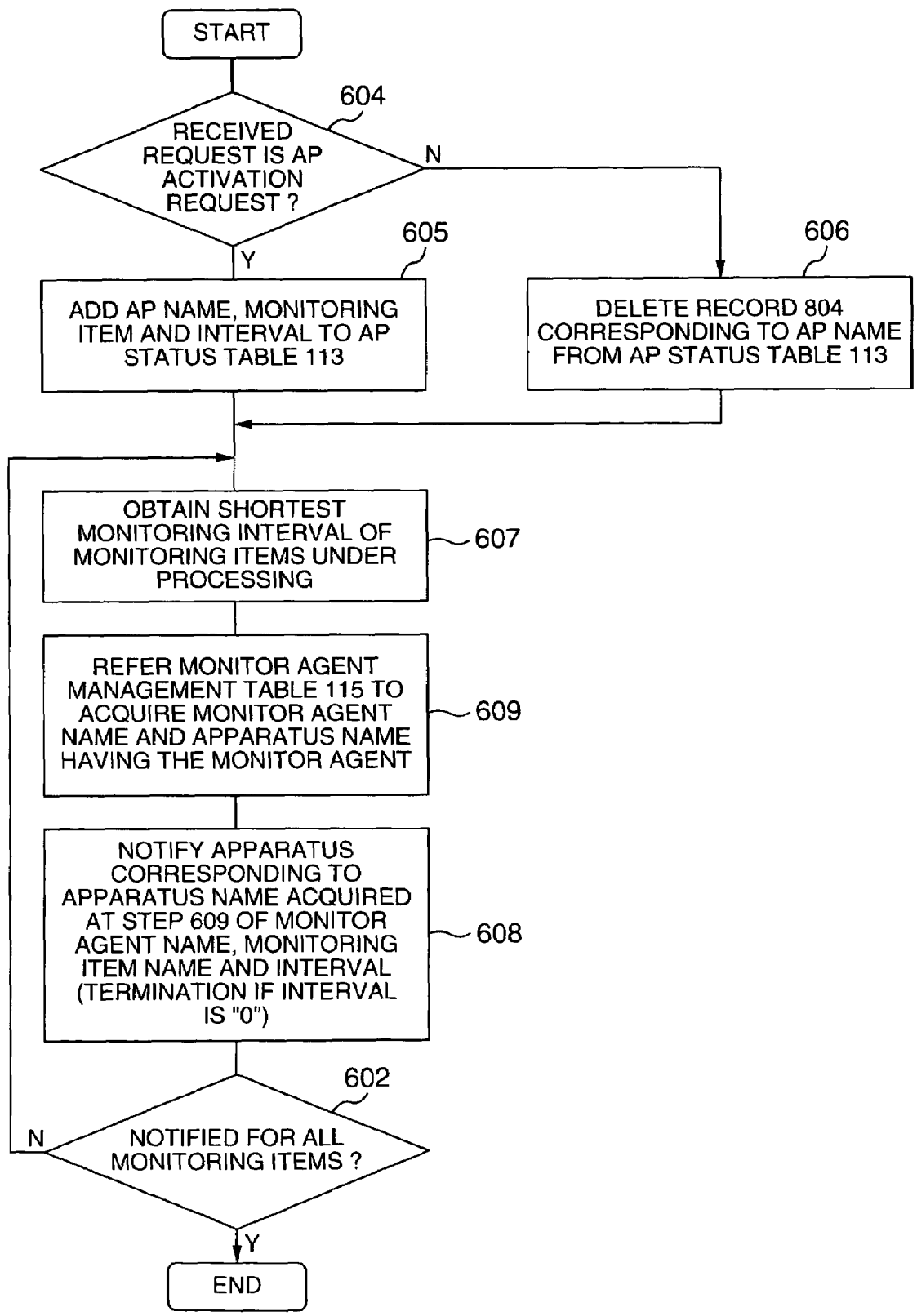
FIG. 11 is a diagram showing an example of the processes of determining a monitor agent control method.

Next, with reference to FIG. 11, description will be made on an example of the sequence of a monitor agent control execution process 504. The management server 1 checks first whether the request received from the business server 2 is an application activation notice (Step 604). If the request is the application activation notice, the management server 1 adds the application name, monitoring item and interval acquired at Steps 502 and 503 to the application status table 113.

If the request is not the application activation notice (i.e., an application termination notice), the management server 1 deletes the record 804 whose field 801 has the application name notified from the business server 2, from business the application status table 113. Next, the management server 1 performs the following processes for each monitoring item set to the application status table 113.

First, the management server 1 refers to the application status table 113 to obtain the shortest monitoring interval (a positive integer. However, if the intervals are all 0's or numerals of 0's or smaller, the shortest monitoring interval is 0), from the monitoring intervals of respective applications registered for respective monitoring items (Step 607). Next, the management server 1 refers to a monitoring item name field 1001 of the monitor agent management table 115 to select a record 1004 coincident with the monitoring item name, and also refers to a monitor agent name field 1002 and an apparatus name field 1003 of the record 1004 to acquire the name of a monitor agent for monitoring the item and the apparatus name (Step 609). If the value obtained at Step 607 is larger than 0, the management server 1 notifies the business server 2 and/or storage subsystem 3 designated by the apparatus name acquired at Step 609 of the name of the monitoring item, the name of the monitor agent for monitoring the item and the shortest monitoring interval. If the shortest monitoring term is 0, the management server 1 notifies the business server 2 and/or storage subsystem 3 of a suspension of monitoring the monitoring item (Step 608).

The management server 1 repeats the processes at Steps 607 and 608 for all the monitoring items set to the application status table 113.

Setting values to the monitor control information table 111, tuning information table 112 and application profile table 102 is executed by the system administrator by inputting the values from a keyboard of the management server 1.

In the following, description will be made on an example of system monitoring and tuning, assuming that a record 203 shown in FIG. 2 is stored in the application profile table 102, a record 305 shown in FIG. 3 is stored in the monitor control information table 111, a record 704 shown in FIG. 4 is stored in the tuning information table 112, a record 903 shown in FIG. 6 is stored in the application schedule 114, and a record 1004 shown in FIG. 7 is stored in the monitor agent management table 115. It is also assumed that the record 804 does not initially exist in the application status table 113.

First, description will be made upon an example of system monitoring when an application 1 (hereinafter called "AP1") indicated by a record 903*a* of the application schedule table 114 is activated.

The business server 2 periodically checks by using the timer whether there is an application to be activated (Step 402 shown in FIG. 9). In this case, the business server 2 checks whether there is an application to be activated, by comparing the check time with the value in the activation time field 902 of each record 903 of the application schedule table 114 shown in FIG. 6.

If the check time is 10:00, this value is coincident with the value in the field 902 of the record 903*a*. Therefore, the business server 2 can judge that AP1 stored in the application name field 902 of the record 903*a* is to be activated. Next, the business server 2 transfers AP1 (application name) indicated by the value in the filed 901 of the record 903*a* to the management server 1. At the same time, the business server 2 notifies the management server 1 of an activation of the application having this application name.

Upon reception of the information of the activation of the application having the application name AP1, the management server 1 refers to the application profile table 102 to select a record 203*a* having AP1 as the application name and acquire a random access of the disk access pattern as the application profile.

Next, the management server 1 refers to the tuning information table 112 to select a record 704*a* indicating that the disk access pattern is the random access, and acquires from the selected record 704*a* the information of the DBMS cache size and its tuning rule as the tuning items (if a hit factor is 85% or smaller, the DBMS cache size is increased).

The management server 1 further refers to the monitor control information table 111 to select a record 305*a* having the DBMS cache size as the tuning item and acquire the information of the monitoring items (DBMS cache hit factor and storage processor use factor) of intervals of the selected record 305*a*. In this example, the monitoring interval for the DBMS cache hit factor is one minute, and the monitoring interval for the storage processor use factor is 0. As described earlier, the monitoring interval 0 means that monitoring is not performed.

Next, the management server 1 judges whether the request received from the business server 2 is an application start or end. In this case, since the request is the start request, the management server 1 adds a record 804*a* to the application status table 113 shown in FIG. 5, the record 804*a* indicating that the application name is AP1, the monitoring interval of the DBMS cache hit factor is one minute and the monitoring interval of the storage processor is 0. Thereafter, the management server 1 obtains the value of the shortest monitoring interval of the DBMS cache hit factor. In this case, the value of the shortest monitoring interval is one minute in the record 804*a*. Next, the management server 1 refers to the monitor agent management table 115 shown in FIG. 7 to acquire a record 1004*a* having the DBMS cache hit factor and the monitoring item name, and refers to fields 1002 and 1003 of the record 1004*a* to acquire the monitor agent name (DB monitor agent) and apparatus name (business server 2). The management server 1 notifies the business server 2 of the shortest monitoring interval (in this example, one minute) of the DBMS cache hit factor, the monitoring item name (DBMS cache hit factor) and the name (DB monitor agent) of an agent for monitoring the monitoring item.

Next, the management server 1 obtains the shortest monitoring interval of the storage processor use factor. In this example, at this time, only the record 804*a* is registered in the application status table 113 and the monitoring interval of the storage processor use factor is 0, so that the shortest monitoring interval is 0. Next, the management server 1 refers to the monitor agent management table 115 shown in FIG. 7 to acquire a record 1004*b* having the storage processor use factor as the monitoring item name, and refers to fields 1002 and 1003 of the record 1004*b* to acquire the monitor agent name (monitor agent) and apparatus name (storage subsystem). The monitoring interval 0 means that monitoring is not performed. Therefore, the management server 1 notifies the storage subsystem 3 of the monitoring item name (storage processor use factor), the name (monitor agent) of an agent for monitoring the monitor item and a termination of monitoring the storage processor use factor.

Upon reception from the management server 1 of a notice of monitoring the DBMS cache hit factor to be monitored by the DB monitor agent at the monitoring interval of one minute, the business server 2 executes the DB monitor agent to monitor the cache hit factor of the DBMS 105 at the monitoring interval of one minute, and sends the obtained monitor data to the management server 1.

Next, description will be made on an example of tuning the DBMS cache size by the system in the above-described system state.

The business server 2 collected the information of the DBMS cache hit factor transmits the information, i.e., monitor data, to the management server 1. Upon reception of the monitor data regarding the DBMS cache hit factor, the management server 1 searches the tuning information table 112 for the record 704 having the rule registered in the field 703 which contains the DBMS cache hit factor. In this example, the rule registered in the field 703 of the record 704a uses the DBMS cache hit factor, so that this record 704a is selected.

The management server 1 judges whether the DBMS cache hit factor contained in the received monitor data satisfies the condition set to the field 703 of the record 704a (in this example, "DBMS cache hit factor is 85% or lower" or "DBMS cache hit factor is 95% or higher"). If the DBMS cache hit factor contained in the received monitor data is 85% or lower, the management server 1 requests the business server 2 to change the tuning item written in the field 702 of the record 704a, in this example, the DBMS cache size, in accordance with the rule 703 in the record 704a.

In this example, the DBMS cache size is increased by 5% in accordance with the rule 703 in the record 704a. After the DBMS cache size is increased by 5%, the management server 1 receives the monitor data with the DBMS cache size changed at Step 505 by the performance management program 101 shown in FIG. 10, and if the DBMS cache hit factor is still 85% or lower, the DBMS cache size is again increased by 5%. In this manner, the management server 1 increases the cache size until the DBMS cache size exceeds 85%.

The business server 2 received the request executes the database tuning agent 107 to change the cache size of the database management system 105.

Next, description will be made on an example of system monitoring when an application 2 (hereinafter also called "AP2") is activated while AP1 runs. It is assumed at this time that only the record 804a is stored in the application status table 113 shown in FIG. 5.

If the time when the application table 114 is referred to is 10:30, the business sever 2 selects a record 903b having the activation time of 10:30 from the application schedule table 114. Next, the business server 2 acquires the application name AP2 from the field 901 of the selected record 903b, and notifies the management server 1 of that the application 2 is to be activated.

The management server 1 received the notice performs similar processes to those for AP1, and adds a record 804b to the application status table 113, the record indicating that the application name is AP1, the monitoring interval of the DBMS cache hit factor is 10 minutes and the monitoring interval of the storage processor use factor is one second.

Thereafter, the management server 1 refers to the application status table 113 to obtain the shortest monitoring interval of the DBMS cache hit factor, and then acquires from the monitor agent management table 115 the name of a monitor agent for monitoring the DBMS cache hit factor and the name of an apparatus having the monitor agent. In this embodiment, the shortest monitoring interval is one minute as obtained from the comparison between the AP1 and AP2 monitoring intervals, the monitor agent name is the DB monitor agent and the apparatus name is the business server. Therefore, the management server 1 instructs the business server 2 to monitor the DBMS cache hit factor to be monitored by the DB monitor agent at the shortest monitoring interval of one minute.

Next, the management server 1 refers to the application status table 113 to obtain the shortest monitoring interval for the storage processor use factor, the name of a monitor agent for monitoring the storage processor use factor and the name of an apparatus having the monitor agent. In this example, the record 1004b indicates that the monitor agent name is the monitor agent and the apparatus name is the storage subsystem, and the record 804b indicates that the shortest monitoring interval is one second. Therefore, the management server 1 issues a notice to the storage subsystem 3 to monitor the storage processor use factor to be monitored by the monitor agent 109 at the interval of one second.

The storage subsystem 3 received the notice makes the monitor agent 109 monitor the user factor of the processor 34, and sends the obtained performance data to the management server 1.

Next, description will be made on an example of monitoring when AP2 is terminated in the state that AP1 and AP2 are running.

Upon detection of an end of AP2, the business server 2 notifies the management server 1 of the name of the terminated application (in this example, AP2) and that the application was terminated.

Upon reception of the notice of the application termination, in accordance with the notified application name the management server 1 acquires a record 203b from the application profile table 102, a record 704b from the tuning information table 112, and a record 305b from the monitor control information table 111. Thereafter, the management server 1 searches a record 804b having AP2 as the value of the field 801 from the application status table 113, and deletes the searched record 804b from the application status table 113.

Thereafter, the management server 1 obtains the shortest monitoring interval of the DBMS cache hit factor from the application status table 113. In this example, the record 804b was already deleted and only the record 804a exists in the application status table 113. Therefore, the shortest monitoring interval is one minute corresponding to the monitoring interval (value in the field 802a) of the DBMS cache hit factor in the record 804a. Next, the management server 1 obtains the name (DB monitor agent) of a monitor agent for monitoring the DBMS cache hit factor and the name (business server) of an apparatus having the monitor agent, and notifies the business server 1 of the monitor agent name, the monitoring item and the previously obtained shortest monitoring interval. Next, the management server 1 obtains the shortest monitoring interval of the storage processor use factor. In this example, the value 0 of the field 802b of the record 804a is adopted.

Thereafter, the management server 1 obtains a monitor agent name (monitor agent) and apparatus name (storage subsystem) in the similar manner to that described above, and notifies the storage subsystem 3 of a termination of monitoring the storage processor use factor monitored by the monitor agent having the name of "monitor agent".

As described above, since the monitoring item is changed in accordance with the application profile of an application to be executed by the server, it becomes possible to monitor only the necessary item.

Next, an example of a second embodiment will be described.

Figure 12:
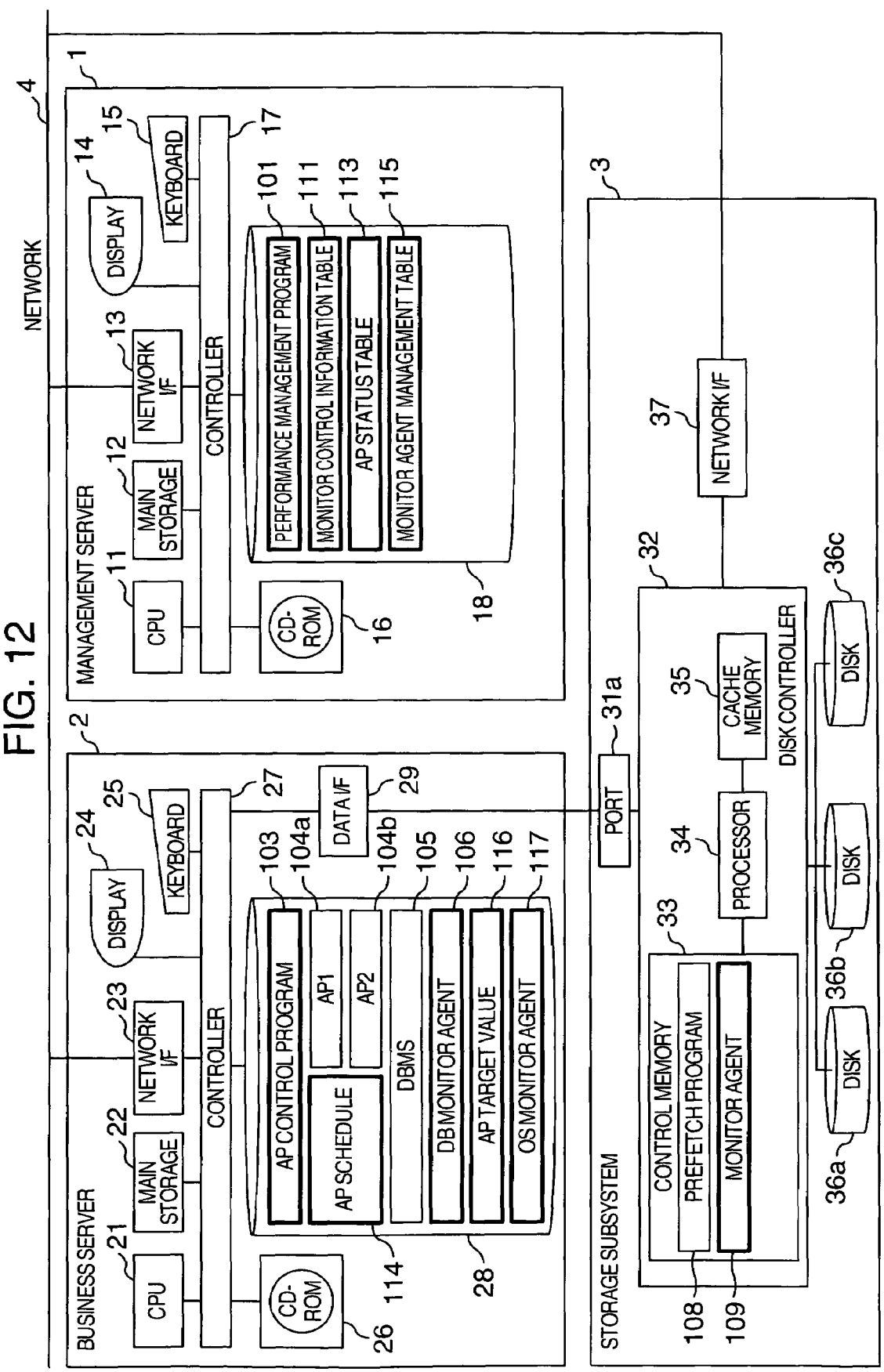
FIG. 12 is a diagram showing an example of the configuration of a system including a computer and a storage subsystem according to a second embodiment.

FIG. 12 is a diagram showing an example of the configuration of a system according to the second embodiment. The second embodiment is different from the first embodiment in that a business server 2 is additionally provided with an AP target value table 116 for storing information regarding an AP target and an OS monitor agent 117 for acquiring a performance data of the business server 2. The contents of a monitor control information table 111' are also different from the first embodiment. The invention also includes a system having the systems of both the first and second embodiments. In the second embodiment, if the performance requested for an application to be executed by the system is not satisfied, the system notifies this effect to the administrator or the like. Therefore, in the second embodiment, the tuning item associated with the profile of an application is replaced by an optional performance target designated by the administrator.

FIG. 13 is a diagram showing an example of the structure of the monitor control information storage table 111' used by the second embodiment. The monitor control information table 111' registers information representative of a correspondence among respective performance targets of the system, and a monitoring item and interval required to be monitored in order to achieve the performance target. The monitor control information storage table 111' has a record corresponding to each performance target (hereinafter, called "performance target item").

Each record has a field 1301 for registering a performance target item and a field 1302 indicating which monitoring item in the corresponding performance target item is monitored (or not monitored) at what interval. In this embodiment, if a transaction time and an average I/O time are used as the performance target items, fields 1302a and 1302b store as the monitoring items the information of at what interval, a transaction response indicating a time from the start to end of a transaction and an average I/O time indicating an average of I/O responses relative to the storage subsystem 3, are monitored (or not monitored). Depending upon an application to be used, the monitoring item is not disclosed in this embodiment in some cases.

FIG. 14 is a diagram showing an example of the structure of the AP target value table 116 for storing a target performance (hereinafter called an "AP target") to be achieved by an application to be executed by the business server 2. The table 116 stores an application name, a performance target item and a target value to be achieved by the application. The table 116 has a record for each application. Each record has a field 1401 indicating the application name, a field 1402 indicating the performance target item corresponding to the application and a field 1403 indicating the performance target value.

FIG. 15 is a diagram showing an example of the structure of an application status table 113 of this embodiment. Each record of this table has a field 801 for storing the name of a presently running application, and a field 802 indicating a monitoring interval for the monitoring item of the corresponding application. Each record 804 of the application status table 113 is added when the management server 1 receives a notice of activation from the business server, and deleted when an end notice is received.

FIG. 16 is a diagram showing an example of the structure of a monitor agent management table 115 of this embodiment. Each record of the monitor agent management table 115 has a field 1001 for storing a monitoring item name, a filed 1002 for storing the name of a monitor agent which monitors the monitoring item and an apparatus name field 1003 for storing the name of an apparatus in which the monitor agent exists. Each of the table information is registered in each apparatus by the administrator via the network before the performance management program 101 starts.

In the following, with reference to FIG. 17, description will be made on the overall flow of monitoring by the system of this embodiment. In the following, if a program is used as the subject of a sentence, the actual process is executed by CPU executing the program.

First, a timer activates the application control program 103 of the business server 2 (Step 401). The application control program 103 refers to the application schedule table 114 to check if there is an application to be activated. If there is an application to be activated, the application control program 103 refers to the target value table 116 to acquire a performance target item of an AP to be activated, and notifies the performance management program 101 of the management server 1 of the application name, an application activation and the performance target item via the network 4 (Steps 404 and 408).

The performance management program 101 received the application name and performance target item refers to the monitor control information table 111' to acquire the monitoring item and interval corresponding to the performance target item (Step 503). The performance management program 101 notifies the acquired monitoring item and interval to the monitor agents 106 and 109 of the business server 2 and storage subsystem 3 (Step 504). The outline of the succeeding processes is the same as that shown in FIG. 8 so that the description thereof is omitted.

In the following, description will be made on the details of the procedure to be executed at each apparatus. Reference numerals identical to those shown in FIG. 17 indicate coincident processes at Steps.

Figure 18:
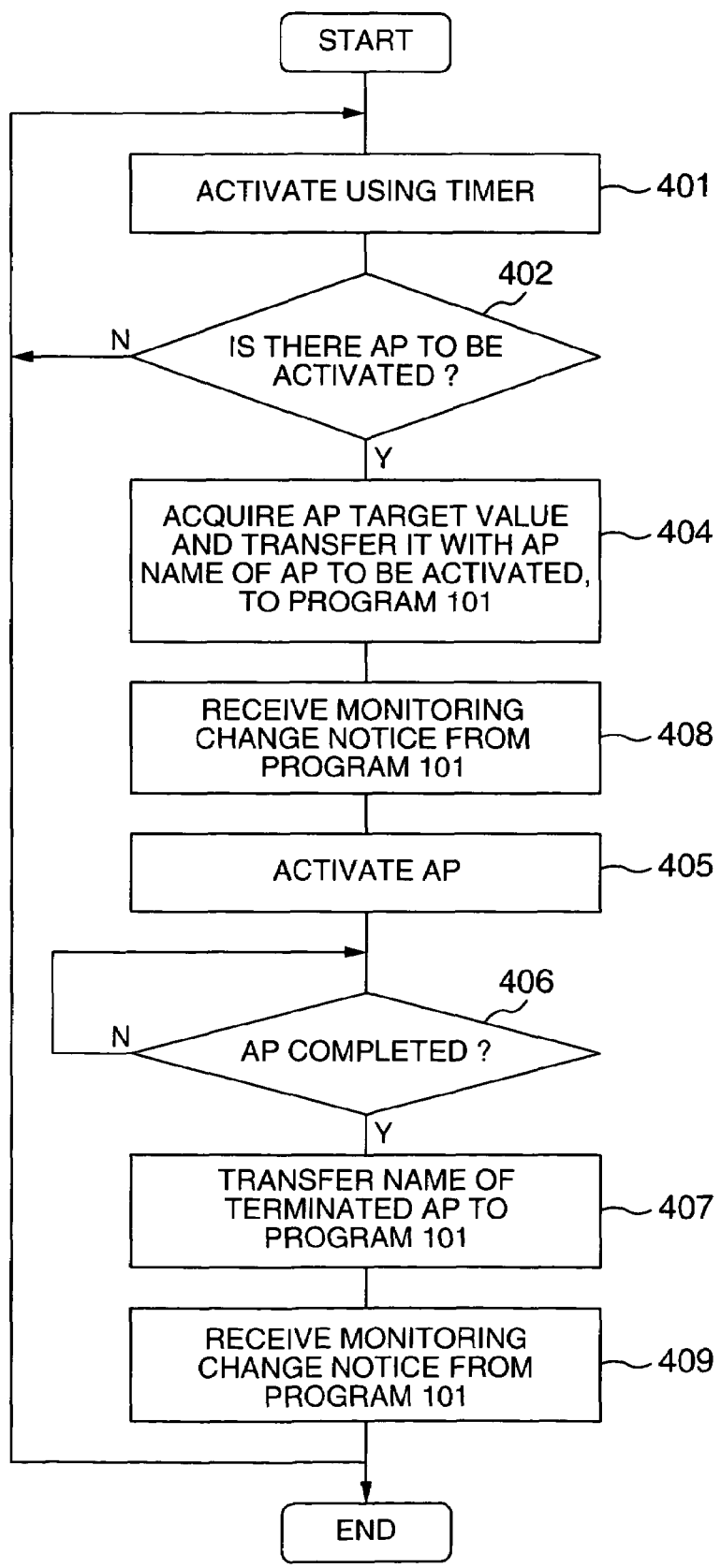
FIG. 18 is a diagram showing an example of the processes to be executed when a business server starts executing an application.

FIG. 18 is a diagram illustrating an example of the procedure to be executed when the business server 2 executes the application control program 103 as the application 104 starts being executed.

The business server 2 first refers to the field 114 of the application schedule table 114 to judge if there is an application to be activated (Step 402). If there is an application to be activated, the business server 2 acquires the name of the application to be activated from the field 901 and the performance target item and target value of the AP to be activated from the AP target value table 116, and transmits the acquired application name, performance target item and target value and an activation notice of the application 104 to the management server 1 via the network I/F 23 (Step 404). The succeeding processes are the same as those shown in FIG. 9 so that the description thereof is omitted. In this embodiment, although the notice of changing the monitoring contents is received, the notice may not be received similar to FIG. 9.

Figure 19:
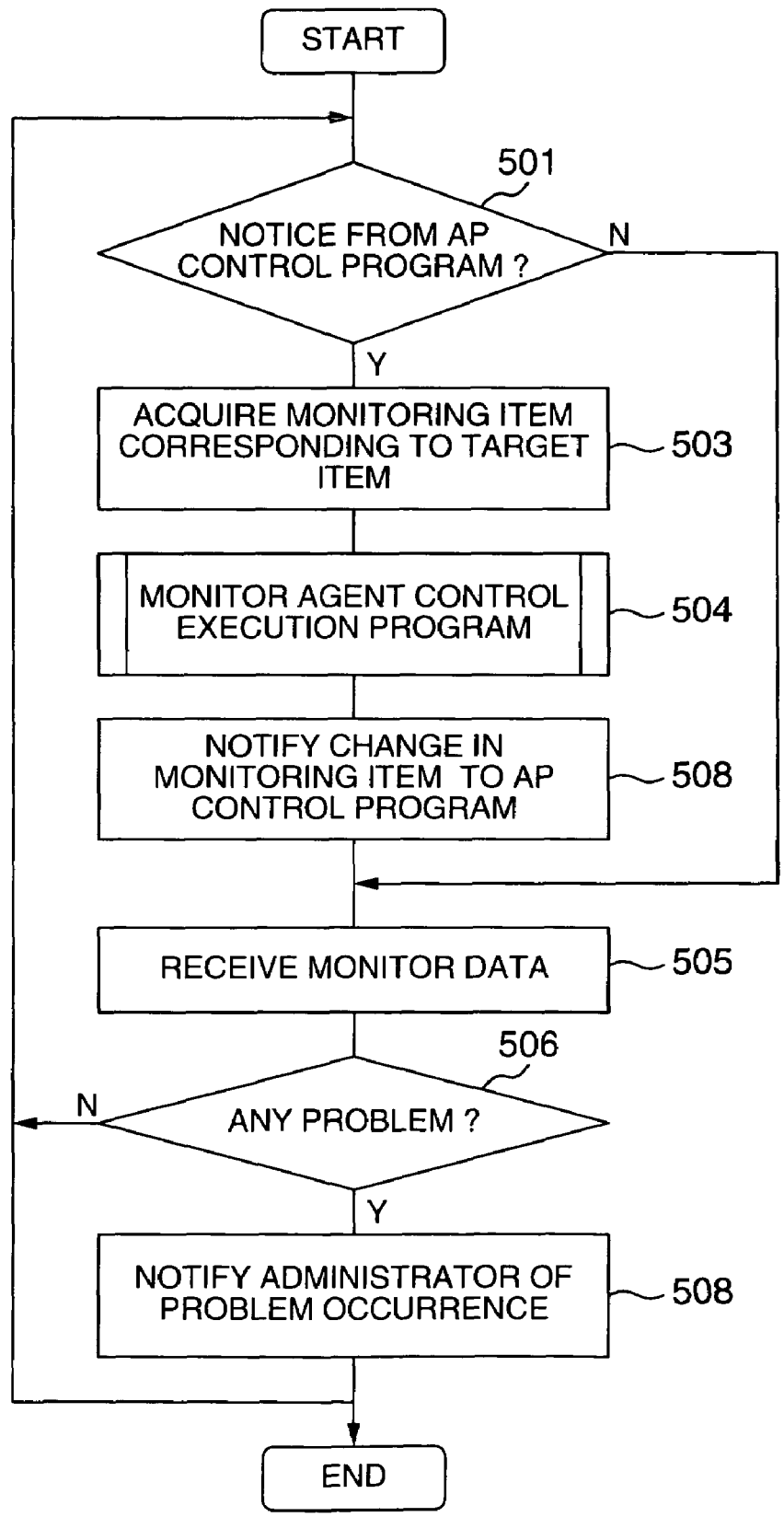
FIG. 19 is a diagram showing an example of the processes of executing a control of monitoring by a management server according to the second embodiment.

FIG. 19 is a diagram illustrating an example of the procedure to be executed when the management server 1 of the embodiment executes the performance management program 101 to monitor the computer system.

First, the management server 1 checks whether the notice of an application start or end is issued from the business server 2 (Step 501). Next, the management server 1 refers to the monitor control information table 111' shown in FIG. 13 to acquire the monitoring item and interval corresponding to the performance target item notified by the business server 2 (Step 503). The succeeding processes up to Step 505 are the same as shown in FIG. 10 so that the description thereof is omitted.

The management server 1 received the monitoring data compares the performance target value previously received from the business server 2 with the monitoring data received at Step 505 (Step 506), and if the value of the monitoring data does not reach the target value, the management server 1 notifies the administrator of an occurrence of the problem (Step 507). The notice to the administrator is made, for example, by a display on a management terminal (not shown).

In the following, description will be made on an example of monitoring and tuning in the system, assuming that the record 305 shown in FIG. 13 is stored in the monitor control information table, the record 903 shown in FIG. 6 is stored in the application schedule table 114 and the record 1004 shown in FIG. 16 is stored in the monitor agent management table 115. It is also assumed that the record 804 does not exist in the application status table 113.

First, description will be made on an example of monitoring in the system when an application 1 (hereinafter described as "AP1") indicated by the record 903a of the application schedule table 114 is activated.

The business server 2 periodically checks by using the timer whether there is an application to be activated (Step 402 shown in FIG. 18). In this case, the business server 2 checks whether there is an application to be activated, by comparing the check time with the value in the activation time field 902 of each record 903 of the application schedule table 114 shown in FIG. 6.

If the check time is 10:00, this value is coincident with the value in the field 902 of the record 903a. Therefore, the business server 2 can judge that AP1 stored in the application name field 901 of the record 903a is to be activated. Next, the business server 2 refers to the AP target table 116 shown in FIG. 14 to search the record of AP1 having the name of AP to be activated this time same as the value in an AP name field 1401 of a record 1404. In this case, the record corresponds to a record 1404a. Thereafter, the business server 2 transfers the values (transaction time and 3 seconds or shorter) stored in a performance target item field 1402 and a performance target value field 1403 of the record 1404a, together with AP1 (application name) corresponding to the value in the field 901 of the previously acquired record 903a, to the management server 1. At the same time, the business server 2 notifies the management server 1 of that an application having this application name is to be activated.

Upon reception of the information that the application having the application name AP1 is to be activated and the information that the performance target item is the transaction time and the performance target value is 3 seconds or shorter, the management server 1 refers to the monitor control information table 111' to select a record 305c indicating that the performance target item is the transaction time and acquire the monitoring item (transaction response and average I/O time) and interval in the selected record 305c. In this example, the monitoring interval of the transaction response is one minute, and the monitoring interval of the average I/O time is 0. As described earlier, the monitoring interval of 0 means that the monitoring is not executed.

Next, the management server 1 judges whether the request received from the business server 2 is an application start or end. In this case, since the request is the application start of AP1, the management server 1 adds a record 804c to the application status table 113 shown in FIG. 5, the record 804c indicating that the monitoring interval of the transaction response is one minute and the monitoring interval of the average I/O time is 0. Thereafter, the management server 1 obtains first the value of the shortest monitoring interval of the transaction response. In this example, the shortest monitoring interval is one minute in the record 804c. Next, the management server 1 refers to the monitor agent management table 115 shown in FIG. 16 to acquire the record 1004c indicating that the monitoring item name is the transaction response, and refers to fields 1002 and 1003 of the record 1004c to acquire the monitor agent name (DB monitor agent) and the apparatus name (business server). The management server 1 notifies the business server 2 of the shortest monitoring interval (in this case, one minute) in monitoring the transaction response, and of the monitoring item name (transaction response) and the name of the monitor agent (DB monitor agent) for monitoring the monitoring item.

Next, the management server 1 obtains the shortest monitoring interval of the average I/O time. In this example, at this time, only the record 804c is registered in the application status table 113 and the monitoring interval of the average I/O time in the record 804c is 0. Therefore, the shortest monitoring interval is 0. Next, the management server 1 refers to the monitor agent table 115 shown in FIG. 16 to acquire a record 1004d indicating that the monitoring item name is the average I/O time, and refers to fields 1002 and 1003 of the record 1004d to acquire the monitor agent name (OS monitor agent) and apparatus name (business server). Since the monitoring interval of 0 means that monitoring is not executed, the management server 1 notifies the business server 2 of the monitoring item name (average I/O time), the monitor agent name (OS monitor agent) for monitoring the monitoring item and a notice indicating that monitoring of the average I/O time is stopped.

Upon reception of the notice that the transaction response to be monitored by the DB monitor agent is monitored at the interval of one minute, the business server 2 monitors the response time of the transaction of DBMS 105 at the interval of one minute, and transmits the obtained monitor data to the management server 1.

If the transaction response received at Step 505 is one second, this response satisfies the target performance value of 3 seconds so that the process returns to the top of the loop. If the response is 10 seconds, at Step 508 the management terminal is displayed with an indication that the transaction response does not reach the performance target value. The display items include the performance target item (in this example, the transaction time) not reached the performance target value, the target time (3 seconds), the monitored time (10 seconds) and other information.

Next, description will be made on an example of monitoring in the system when AP2 is activated while AP1 is running. It is assumed that at this time only the record 804c is stored in the application status table 113 shown in FIG. 15.

The business server 2 selects the record 903b indicating the activation time is 10:30 from the application schedule table 114, assuming that the time when the application table 114 is referred is 10:30. Next, the business server 2 acquires the application name AP2 from the field 901 of the selected record 903b, and notifies the management server 1 of that AP2 is to be activated.

The management server 1 received the notice executes similar processes to those for AP1 to thereby add the record 804d indicating that the application name is AP2, the monitoring interval of the transaction response is 0 (i.e., monitoring is not executed) and the monitoring interval of the average I/O time is one minute.

Thereafter, the management server 1 refers to the application status table 113 to obtain first the shortest monitoring interval of the transaction response, and further acquires the name of a monitor agent for monitoring the transaction response and the name of an apparatus having the monitor agent, from the monitor agent management table 115. In this example, the shortest monitoring interval is one minute obtained through the comparison between the monitoring interval of AP1 and the monitoring interval of AP2, the monitor agent name is the DB monitor agent and the apparatus name is the business server. Therefore, the management server 1 notifies the business server 2 of that the transaction response to be monitored by the DB monitor agent is monitored at the shortest monitoring interval of one minute. Next, the management server 1 refers to the application status table 113 to acquire the shortest monitoring interval of the average I/O time, the name of a monitor agent for monitoring the average I/O time and the name of an apparatus having the monitor agent. In this case, the record 1004d indicates that the monitor agent name is the OS monitor agent and the apparatus name is the business server, and the record 804d indicates that the shortest monitoring interval is one minute. Therefore, the management server 1 notifies the business server 2 of that the average I/O time to be monitored by the OS monitor agent 117 is monitored at the interval of one minute.

The storage subsystem 3 received the notice monitors the use factor of the processor 34 by using the monitor agent 109, and transmits the obtained performance data to the management server 1.

Next, description will be made on an example of monitoring when AP2 is terminated in the state that AP1 and AP2 are running.

Upon detection of an end of AP2, the business server 2 notifies the management server 1 of the name of the terminated application (in this example, AP2) and that the application was terminated.

Upon reception of the notice of the application termination, the management server 1 deletes the record 804d indicating that AP2 is the AP name, from the AP status table 113.

Thereafter, the management server 1 obtains the shortest monitoring interval of the transaction response from the application status table 113. In this example, the record 804d was already deleted and only the record 804c exists in the application status table 113. Therefore, the shortest monitoring interval is one minute of the monitoring interval (value in the field 802c) of the transaction response of the record 804c. Next, the management server 1 obtains the name of a monitor agent for monitoring the transaction response and the name of an apparatus (business server) having the monitor agent, and notifies the business server 2 of the monitor agent name, monitoring item and already obtained shortest monitoring interval. Next, the management server 1 obtains the shortest monitoring interval of the average I/O time. In this example, the value 0 is adopted being stored in the field 802b of the record 804c.

Thereafter, similar to the above, the management server 1 obtains the monitor agent name (OS monitor agent) and the apparatus name (business server), and notifies the business server 2 of that monitoring the average I/O time by the monitor agent having the name of the OS monitor agent is terminated.

As described above, according to this embodiment, the monitoring item to be judged whether an application realizes the performance target, is changed by receiving the performance target from the application so that it is possible to monitor only the necessary item.

The management server 1 may have the AP target value table 116. In this case, the management server 2 notifies the management server 1 of the name of an application to be executed by the management server and information of an execution start. The management server 1 identifies the monitoring item by using each table.

In this embodiment, if the system performance does not satisfy the value of the performance target item, the management server 1 notifies this to the administrator or the like. However, similar to the first embodiment, the management server 1 may have the information regarding the tuning method, and in accordance with this information, the management server 1 performs the tuning of the system performance.

It should be further understood by those skilled in the art that although the foregoing description has been made on embodiments of the invention, the invention is not limited thereto and various changes and modifications may be made without departing from the spirit of the invention and the scope of the appended claims.

According to the present invention, it is possible to perform tuning of a computer system in accordance with an environment. Further, it is possible to reduce a load of the computer system to be caused by monitoring for tuning the computer system and to reduce a load of the network to be caused by monitoring.

What is claimed is:

1. A system comprising:
a computer system; and
a second computer connected to said computer system,
wherein said computer system comprises:
  a first computer connected to said second computer; and
  a storage subsystem connected to said second computer,
wherein said second computer comprises:
  a first table, which includes a first record corresponding to each type of program to be executed on said computer system, each first record including an identifier of the program to be executed, and a tuning item of a resource to be tuned, corresponding to the program to be executed;
  a second table, which includes a second record corresponding to each said type of program to be executed, each second record including an identifier of the program to be executed, and a profile of the program to be executed; and
  a third table, which includes a third record corresponding to each tuning item, each third record including an identifier corresponding to the tuning item, and an indicator of a performance monitoring item that indicates what performance of said computer system is monitored when the tuning item is controlled and at what interval the performance is monitored or not monitored,
wherein said storage subsystem comprises a processor,
wherein said first computer notifies said second computer of the type of program to be executed on said computer system,
wherein said second computer acquires the tuning item corresponding to the type of program to be executed from the first table, acquires the profile of the program to be executed from the second table, and identifies a first performance monitoring item based on the type of the program to be executed from the third table, and issues to said computer system a notice to collect first performance information regarding said first performance monitoring item, and
wherein said computer system collects said first performance information in accordance with said notice to collect said first performance information.

2. The system according to claim 1, wherein said computer system notifies said second computer that said first performance information has been collected,
wherein said second computer transmits an instruction to change settings of said computer system to a predetermined value, if said first performance information does not satisfy a predetermined condition, and
wherein said computer system changes the settings in accordance with said instruction.

3. The system according to claim 2,
wherein said computer system notifies said second computer of a type of a program to be terminated at said computer system,
wherein said second computer identifies a second performance monitoring item in accordance with the type of the program to be terminated, and issues to said computer system an instruction to terminate a collection of second performance information regarding said second performance monitoring item, and
wherein said computer system terminates the collection of said second performance information in accordance with the instruction to terminate said collection of second performance information.

4. The system according to claim 3,
wherein said notice of the collection of said first performance information contains information regarding an interval at which said computer system collects said first performance information, and
wherein said computer system collects said first performance information at said interval, based on said information regarding the interval.

5. The system according to claim 4, wherein said second computer identifies each performance monitoring item to be monitored by said first computer and said storage subsystem, based on the type of the program to be executed at said computer system, and notifies said first computer and said storage subsystem of the collection of performance information regarding each performance monitoring item.

6. The system according to claim 5, wherein said second computer identifies said performance monitoring item in accordance with a program profile of the program to be executed at said computer system.

7. The system according to claim 6, wherein said program profile includes input/output characteristics from said first computer to said storage subsystem based on the program to be executed at said computer system.

8. The system according to claim 7, wherein said input/output characteristics include a sequential access and a random access.

9. The system according to claim 8, wherein said performance monitoring item includes an item of a use factor of the processor of said storage subsystem.

10. The system according to claim 9, wherein said computer executes a database management system, and said performance monitoring item includes a use factor of a memory of said computer by said database management system.

11. The system according to claim 10, wherein said predetermined condition is a condition that the use factor of the processor of said storage subsystem does not exceed a predetermined ratio.

12. A computer connected to a computer system, comprising:
a processor;
a storage unit; and
an interface that connects the computer to said computer system,
wherein said storage unit stores:
a first table, which includes a first record corresponding to each type of program to be executed by said processor, each first record including an identifier of the program to be executed, and a tuning item of a resource to be tuned, corresponding to the program to be executed;
a second table, which includes a second record corresponding to each said type of program to be executed, each second record including an identifier of the program to be executed, and a profile of the program to be executed; and
a third table, which includes a third record corresponding to each tuning item, each third record including an identifier corresponding to the tuning item, and an indicator of a performance monitoring item that indicates what performance of said computer system is monitored when the tuning item is controlled and at what interval the performance is monitored or not monitored,
wherein said computer system notifies said computer of the type of program to be executed by said processor, and
wherein based on the type of program to be executed, said processor acquires the tuning item corresponding to the type of program to be executed from the first table, acquires the profile of the program to be executed from the second table, and identifies said performance monitoring item corresponding to said program to be executed from the third table, and instructs said computer system to collect information regarding said identified performance monitoring item via said interface.

13. The computer according to claim 12, wherein first information contains second information representative of a relation between said program and the profile of said program, and third information representative of a relation between the profile of said program and said performance monitoring item.

14. The computer according to claim 13,
wherein said storage unit further stores fourth information regarding a change in settings of said computer system,
wherein said fourth information is used when said performance information does not satisfy a predetermined condition, and
wherein said processor instructs said computer system to change the settings based on the performance information and the fourth information.

15. A computer system connected to a first computer, comprising:
a second computer connected to said first computer via a network; and
a storage subsystem connected to said first computer via a network,
wherein said first computer comprises:
a first table, which includes a first record corresponding to each type of program to be executed on said second computer, each first record including an identifier of the program to be executed, and a tuning item of a resource to be tuned, corresponding to the program to be executed;
a second table, which includes a second record corresponding to each said type of program to be executed, each second record including an identifier of the program to be executed, and a profile of the program to be executed; and
a third table, which includes a third record corresponding to each tuning item, each third record including an identifier corresponding to the tuning item, and an indicator of a performance monitoring item that indicates what performance of said computer system is monitored when the tuning item is controlled and at what interval the performance is monitored or not monitored,
wherein said storage subsystem comprises a processor,
wherein said second computer notifies said first computer of the type of program to be executed on said second computer, wherein said first computer acquires the tuning item corresponding to the type of program to be executed from the first table, acquires the profile of the program to be executed from the second table, acquires the performance monitoring item and the interval based on the type of program to be executed, from the third table, and provides information regarding acquires the tuning item corresponding to the type of program to be executed from the first table, acquires the profile of the program to be executed from the second table, and the performance monitoring item and the interval to said second computer, and wherein based on said type of the program to be executed, said second computer and said storage subsystem collect said information of said performance monitoring item at said interval, and notify said first computer of said information collected regarding said performance monitoring item.

16. The computer system according to claim 15,
wherein said second computer and said storage subsystem receive from said first computer a notice of instructing a change in settings from said first computer, and
wherein said second computer and said storage subsystem change the settings in accordance with said notice.

17. A system comprising:
a computer system; and
a second computer connected to said computer system,
wherein said computer system comprises:
  a first computer; and
  a storage subsystem, wherein said first computer executes a database management system, and comprises:
a first processor; and
a storage unit,
wherein the storage unit stores:
  a first table, which includes a first record corresponding to each type of program to be executed on said computer system, each first record including an identifier of the program to be executed, and a tuning item of a resource to be tuned, corresponding to the program to be executed;
  a second table, which includes a second record corresponding to each said type of program to be executed, each second record including an identifier of the program to be executed, and a profile of the program to be executed; and
  a third table, which includes a third record corresponding to each tuning item, each third record including an identifier corresponding to the tuning item, and an indicator of a performance monitoring item that indicates what performance of said computer system is monitored when the tuning item is controlled and at what interval the performance is monitored or not monitored, wherein said storage subsystem comprises a second processor,
wherein said first computer notifies said second computer of a type of the program to be executed at said computer system,
wherein said second computer acquires the tuning item corresponding to the type of program to be executed from the first table, acquires the profile of said program based on the type of said program to be executed from the second table, acquires a performance monitoring item from said profile, based on the type of the program to be executed, from the third table, and issues a notice of a collection and a collection interval of information regarding said performance monitoring item, to said first computer and said storage subsystem of said computer system,
wherein said first computer and said storage subsystem of said computer system collects said performance information at said interval in accordance with said notice, and notifies said second computer of said performance information collected,
wherein said second computer transmits an instruction to change settings of said computer system to a predetermined value to said computer system, and
wherein said computer system changes the settings in accordance with said instruction.

* * * * *